United States Patent [19]
LeMay et al.

[11] Patent Number: 5,101,958
[45] Date of Patent: Apr. 7, 1992

[54] FLOWSPITTING CONVEYOR

[75] Inventors: Curtis E. LeMay, Shelbyville; David H. Cotter, Coopersville, both of Mich.

[73] Assignee: Rapistan Corp., Grand Rapids, Mich.

[21] Appl. No.: 697,709

[22] Filed: May 9, 1991

[51] Int. Cl.$^5$ .............................................. B65G 47/28
[52] U.S. Cl. ...................................... 198/436; 198/437
[58] Field of Search .............. 198/369, 436, 437, 370, 198/372

[56] References Cited

U.S. PATENT DOCUMENTS

| | | | |
|---|---|---|---|
| 1,292,178 | 1/1919 | Waterman | 198/436 |
| 2,566,417 | 9/1951 | Holm | 198/436 |
| 3,241,651 | 3/1966 | Colby | 198/437 |
| 3,580,379 | 5/1971 | Shuster et al. | 198/437 X |
| 3,973,672 | 8/1976 | Frost | 198/436 X |
| 4,044,897 | 8/1977 | Maxted | 198/448 X |
| 4,264,002 | 4/1981 | Van Der Schie | 198/436 X |
| 4,284,186 | 8/1981 | Brouwer | 198/415 |

FOREIGN PATENT DOCUMENTS

| | | | |
|---|---|---|---|
| 2248216 | 5/1975 | France | 198/437 |
| 0203023 | 9/1986 | Japan | 198/436 |

Primary Examiner—Robert P. Olszewski
Assistant Examiner—James R. Bidwell
Attorney, Agent, or Firm—Price, Heneveld, Cooper, DeWitt & Litton

[57] ABSTRACT

A flowsplitting conveyor device for controlling a load imposed on a conveyor utilizes a load allocating device which is capable of dividing a incoming load between two receiving conveyors for the purpose of balancing the load between the two receiving conveyors or it can be used to allocate the entire load to either one of the receiving conveyors.

10 Claims, 5 Drawing Sheets

FLOWSPITTING CONVEYOR

BRIEF SUMMARY OF THE INVENTION

A means for controlling the load imposed on a conveyor and its associated equipment utilizes a load allocating means which is capable of dividing the incoming load between two receiving conveyors for the purpose of balancing the loads of the receiving conveyors or it can be used to allocate the entire load to either one of the receiving conveyors when the load volume warrants such a procedure.

BACKGROUND OF THE INVENTION

Under the conditions created by the conveyorization necessary in present-day warehousing, manufacturing and article transport, it frequently becomes necessary at times to relieve the load on one article transport line by diverting a portion of the load to another conveyor line. In the past, this has been done largely by labor or, in other cases, by installing two separate lines with the load factor on each being totally independent of the other. This often causes under usage of both systems, resulting in unnecessary costs for both labor and capital equipment. It is not a satisfactory solution to simply close one of the lines during low demand periods. This does not solve the problem when one line is overloaded and the other under used. The invention also makes it possible to concentrate the load entirely on one of the two conveyors when demand is small enough to justify it. It is the purpose of this invention to provide a single solution to each of these problems.

BRIEF DESCRIPTION OF THE INVENTION

The invention provides means whereby the load on a particular line can, when desirable, be automatically divided between two lines and quickly returned to single line operation when the load demand no longer warrants dividing the load. Further, the invention provides means for proportioning the allocation of articles between lines in response to the quantity of articles approaching the diversion point provided by the invention. The invention focuses on the demand for conveyor space to move the articles at a rate consonant with accurate, careful and effective handling. The invention does this by means of an allocating switch which is capable of directing the entire load to one of the conveyors or of dividing the incoming load between two conveyors. It can also be made to proportionalize the load between the two conveyors. Thus, the switch is capable of allocating the load between the conveyors in accordance with volume and demand.

DESCRIPTION OF THE PREFERRED EMBODIMENT

Figure 1:
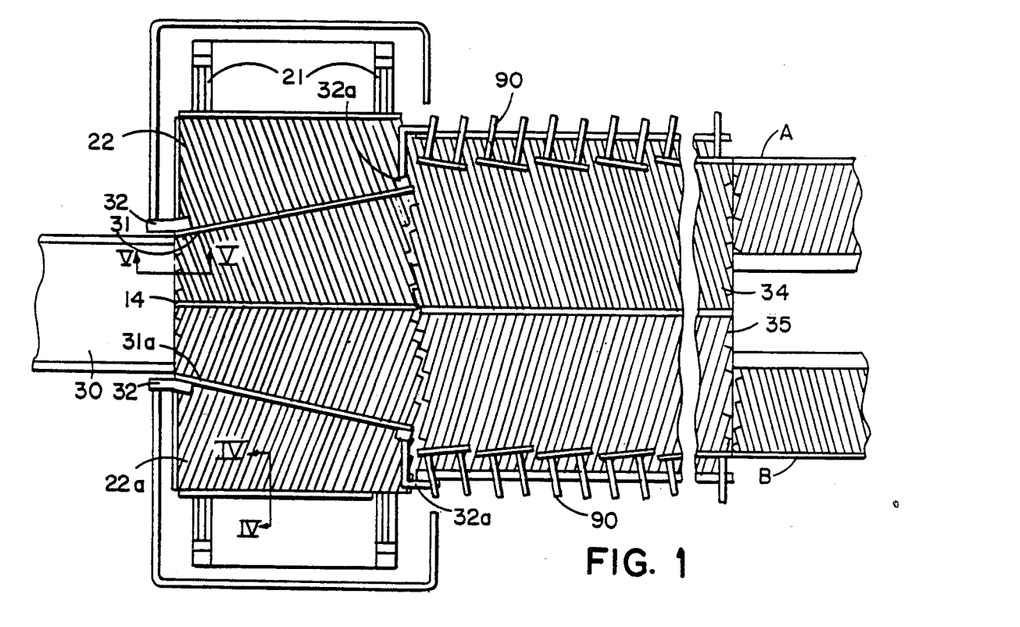
FIG. 1 is a plan view of the invention in neutral position, that is, directing conveyor load to both output conveyors without allocation to either conveyor.
Figure 2:
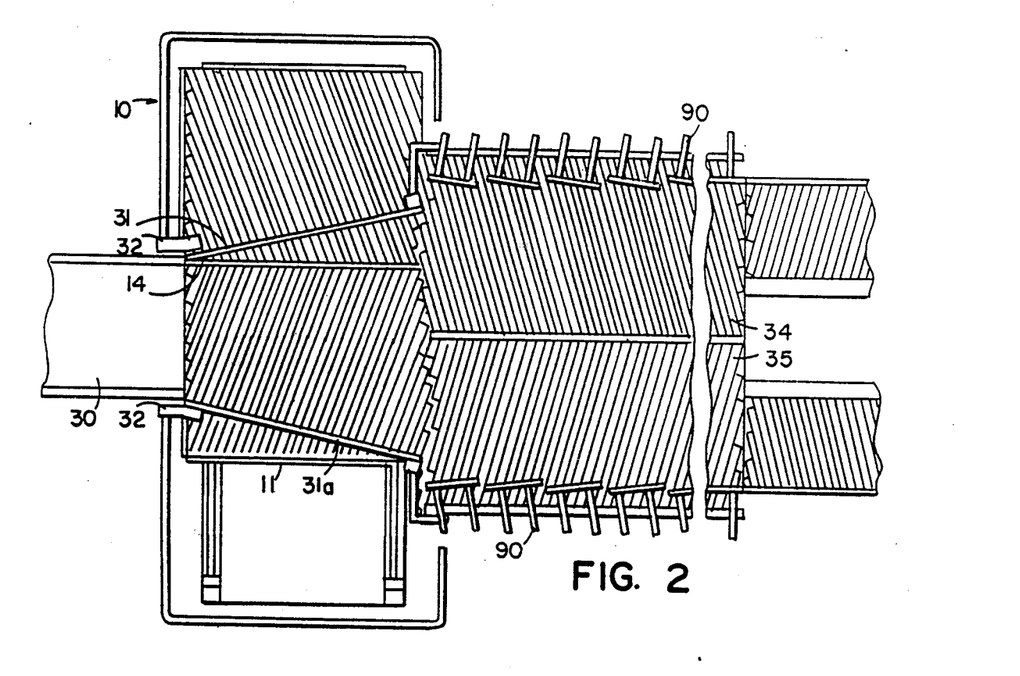
FIG. 2 is a view similar to FIG. 1 illustrating the invention positioned to direct the entire load to one of the output conveyors.
Figure 3:
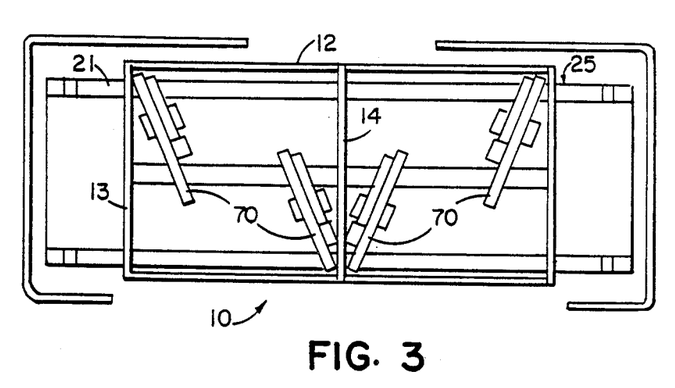
FIG. 3 is a plan view of the lane allocating switch illustrating the drive for the article conveying rollers shown with the rollers removed.

Referring to FIGS. 1 and 2, the numeral 10 refers to a transversely movable load path controlling platform. The platform has a rectangular frame 11 of greater length than its width in the direction of movement. The frame has a peripheral frame including front and back members 12 joined by shorter end members 13 and a central frame member 14 (FIG. 3). The movable platform has stiffeners (not shown) to give rigidity to the platform. These stiffeners are not illustrated since they are conventional and not part of the invention. Such stiffening members have long been used in the conveyor industry. The platform 10 is supported by wheels 20 which roll along a pair of laterally extending tracks 21. The tracks are substantially longer than the width of the platform whereby the platform can be moved transversely in either direction from its central position relative to the path of articles being transported on the conveyor with which the invention is used.

The platform has a pair of side-by-side roller assemblies 22 and 22a, each occupying one half of the surface of the platform (FIG. 1). One end of each of a majority of the individual rollers 24 of each roller assembly is journaled to one of the side or end frame members of that roller assembly and the other end to the central frame member 14. The rollers of the assemblies 22 and 22a are arranged with their axes inclined to the path of the articles entering the platform. The rollers of the assembly 22 are inclined oppositely to those of assembly 22a. Thus, these rollers form a herringbone pattern, the apex of which is centered where the assemblies adjoin each other and points downstream of the movement of articles over the platform.

Figure 4:
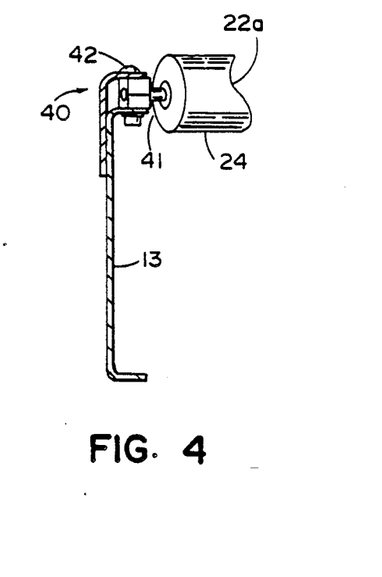
FIG. 4 is an enlarged fragmentary sectional view taken along the plane IV-IV of FIG. 1, illustrating the roller support means ends of the rollers supported on the sides of the article allocator.

The ends of the rollers mounted on either the end members 13 or the central frame member 14 are supported between the top flange of one of the end members 13 or of the central frame member 14 and a bracket 40 (FIG. 4). The axle 41 of each roller is sandwiched between plastic isolator pads 43 and the top flange and the bracket 40 and clamped by a bolt 42. This arrangement allows for vibration and sound damping from the axle to the end or frame member.

Figure 5:
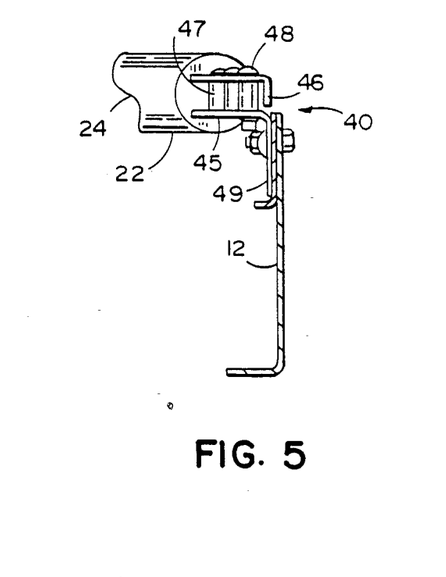
FIG. 5 is a view similar to FIG. 4 taken along the plane V—V of FIG. 1 illustrating the roller supports along the article receiving and discharging sides of the article director.
Figure 6:
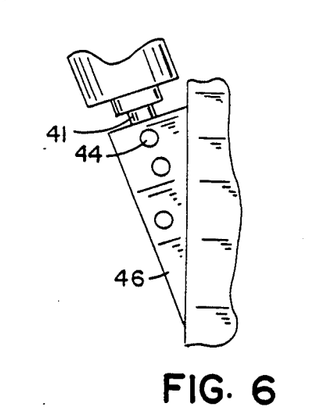
FIG. 6 is a fragmentary plan view of the roller support illustrated in FIG. 5.

The attachment of the rollers to the front and back frame members 12 is illustrated in FIGS. 5 and 6. In this case, the end of the roller axle 41 is secured by a bolt 48 which clamps it between the bracket 45 and a top member 46 (FIG. 5). The bracket and top member have a pair of spacers 47 between them through each of which the bolt 48 extends to pull the bracket and the top member together (FIGS. 5 and 6). The frame member is reinforced by a stiffener 49 between the bracket 45 and the frame member 12. Again, the arrangement allows vibration and sound damping between the roller and the frame 12.

Figure 12:
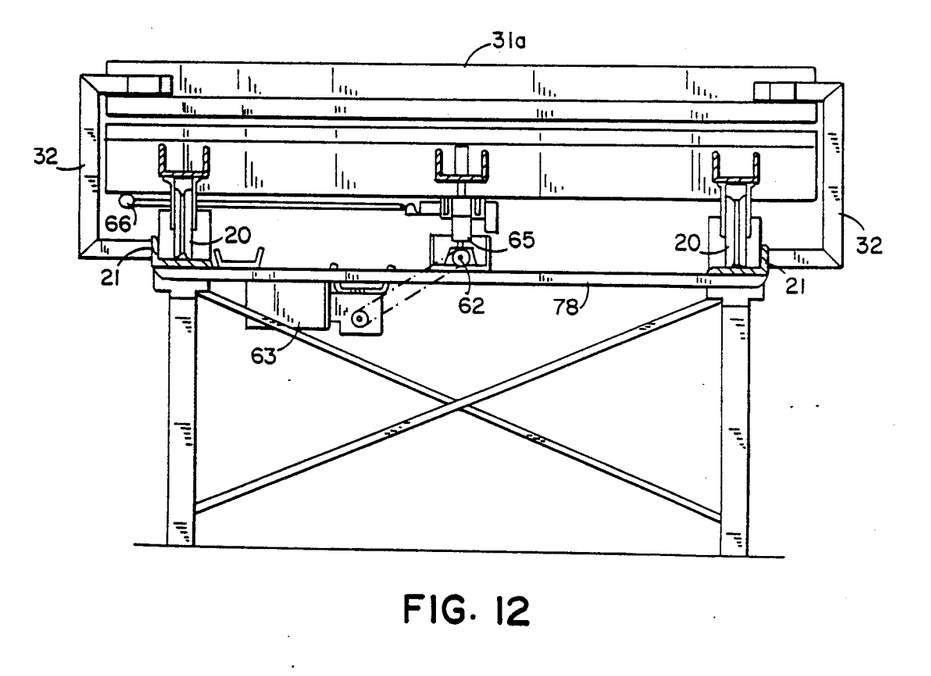
FIG. 12 is an end elevation view of the article path controlling platform.
Figure 13:
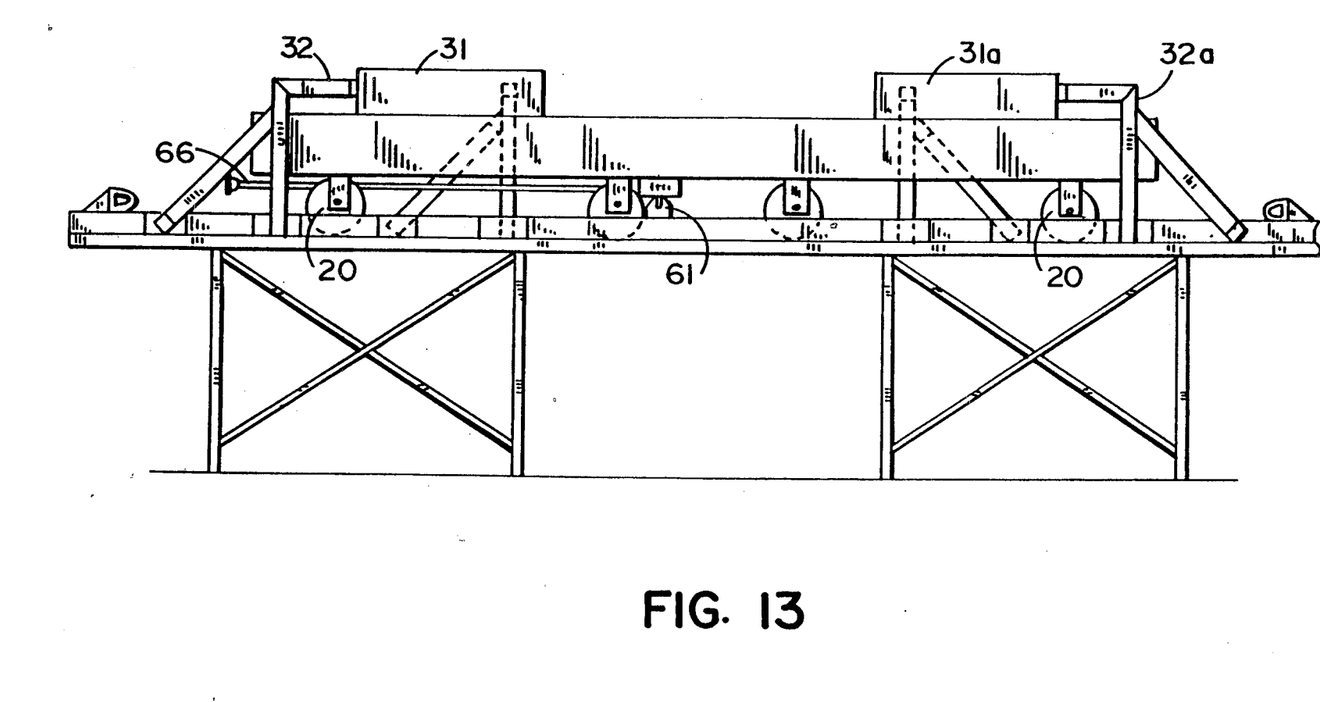
FIG. 13 is a side elevation view of the article path controlling platform.

An infeed conveyor 30 aligns with the central portion of the platform 10 when the platform is in its neutral position, that is, centered between ends of the platform support (FIG. 1). The platform has a pair of guide rails 31 and 31a which are supported on stationary supports 32 and 32a, one at each end and which, in turn, are secured to the platform's supporting structure (FIGS. 1, 12 and 13). The guide rails are arranged to form a V-shaped track, the narrow end of which is aligned with and just wide enough to receive the articles from the infeed conveyor 30. The discharge end of the path defined by the guide rails is substantially wider and aligns with a pair of receiving conveyors 34 and 35.

The movable platform 10 is supported by rollers 20 on the tracks 21 of a stationary frame 25 for movement either to the left or to the right with respect to both the infeed conveyor 30 and the receiving conveyors 34 and 35. As it moves, it shifts the herringbone conveyor configuration onto which the articles are discharged by the infeed conveyor 30 (FIG. 2). Thus, when the platform is shifted to the left of an observer looking downstream of article movement, as illustrated in FIG. 2, the inclination of the rollers over which the articles will be moved will bias the articles to the right. On the other hand, if the movable platform is shifted as far as it can go to the right, the articles will be biased to move to the left. If the platform is shifted, only a portion of its possible travel from center in either direction a greater proportion, but not all, of the articles will be caused to exit the platform onto the conveyor opposite that toward which it has been shifted. Thus, by shifting the platform either to the right or to the left, the discharge of the articles can be proportioned between the conveyors as needed or directed entirely to one of the conveyors. This is a simple and easy to operate system for adjusting the conveyor to accommodate widely varying volume demands.

Figure 14:
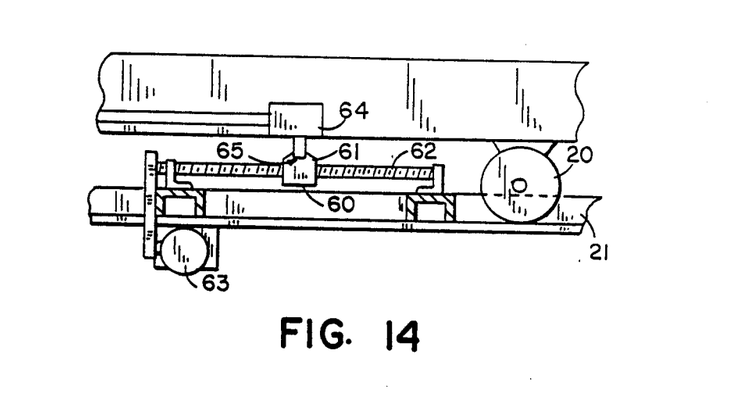
FIG. 14 is an enlarged fragmentary side elevation view of the position changing drive for the platform.

To accomplish this purpose, the platform is supported on wheels 20 which travel on tracks 21 (FIGS. 12 and 14). Movement of the platform along the rails is effected by a dog 60 which engages driver 61 mounted on the threaded member 62. The axis of the threaded member parallels the tracks 21 and is driven by the prime mover 63 to rotate in either direction, depending upon which direction it is desired to move the platform. The dog 60 is slidably mounted for vertical movement in a support member 64 secured to one of the platform's cross members. The dog is normally seated in the slot 65 in the driver member 61 so that movement of the driver member will cause the platform to travel with the driver member. If it is desired to release the platform from control by the driver, the handle 66 at the end of the platform is maneuvered to cause the dog to be lifted and disengage from the driver 61. This is necessary because it is essential in large warehouse operations that this type of equipment continue to be operative even though the functionality of such control means as the prime mover 63 fails. By releasing the platform 10 from the driver 61, it is free to be manually pushed to a position which will accommodate the load of articles being received over the input conveyor and properly proportion their delivery between the two receiving conveyors 34 and 35.

What has been described is satisfactory for situations involving only packaged articles or articles having significant three dimensional characteristics. The handling of flat, thin articles, such as letters and the like, involves the problem of interception of the articles by the guide rails 31 and 31a without the possibility that the article might be carried down under the rails by the rollers rather than transported on the rollers' upper surfaces. The problem is further complicated by the fact that as the frame is moved laterally, whatever means are employed to prevent entrapment of these flat articles by the rollers must be capable of both deflection to pass over the rollers and of automatically returning to active extended position between the next pair of rollers. At the same time, they must positively prevent the articles from being discharged downwardly between adjacent rollers.

Figure 7:
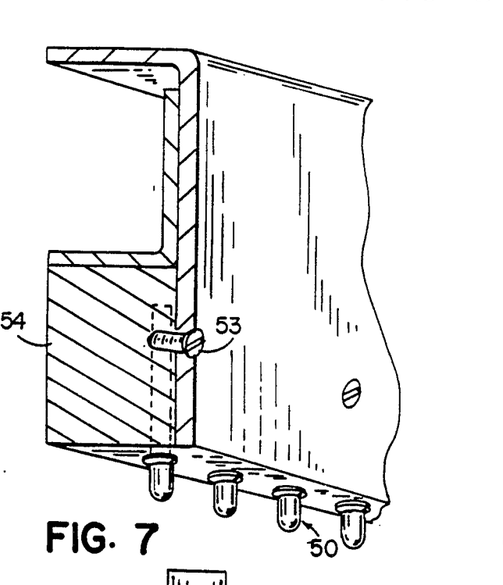
FIG. 7 is an oblique fragmentary sectional view of a guide rail equipped with interroller article stops.
Figure 8:
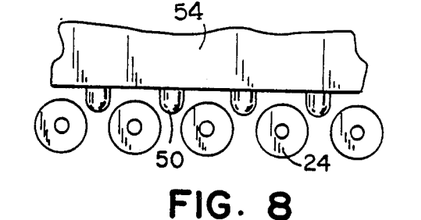
FIG. 8 is a fragmentary elevation view of the relationship of the interroller article stops and the rollers.
Figure 9:
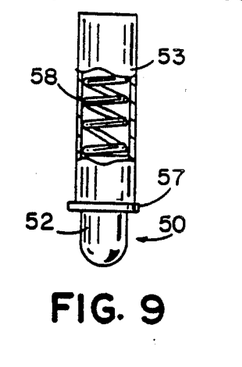
FIG. 9 is an enlarged, partially sectioned view of one of the article stops.
Figure 10:
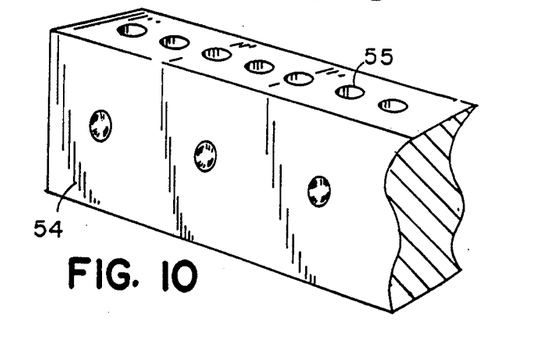
FIG. 10 is a fragmentary oblique view of the mounting block for the interroller article stops.

The invention provides a simple means of accomplishing this by creating a barrier formed of a plurality of fingers 50 each of which has a rounded lower end designed to extend into the space between a pair of adjacent rollers and there provide a positive restraint against both further lateral movement over and downward movement between the transport rollers and by so mounting each finger that it can be retracted by the roller as the platform moves laterally beneath the guide rails (FIGS. 7-10). To do this, each of the fingers 50 preferably is a bolt or pin having a rounded end 52. The tubular housing 53 for the pin and spring is press-fitted into openings in a support block 54. The support block can be molded of a plastic such as ultra high molecular weight polyethylene sold by E. I. DuPont De Nemoirs and have openings 55 of a size such that the pin housing 53 can be press-fitted into it and frictionally held in place. The depth of insertion can be controlled by a flange 57 at the end of the housing (FIG. 9). In extended position, each finger extends partially into the convergent slot between a pair of adjacent rollers to a depth such that it extends below the plane of the tops of the rollers (FIG. 8). Since the fingers extend below this plane they will not allow even a flat object such as an envelop to become trapped between a pair of adjacent rollers and, thus, either be removed from the conveying surface or progressively destroyed by the continuing abrasion of the rollers. To pass over each of the rollers as the platform 10 is moved lengthwise of the track 21 the 21 and transversely of the rails 31 and 31a fingers 50 are mounted for sliding vertical movement in the tubular housing 53 and urged into extended position by a spring 58 (FIG. 9).

The spring 58 need exert only a light pressure against the finger since its purpose is only that of assuring finger extension when roller obstruction is removed. Under normal operating conditions, the weight of the finger alone can effect this action. The spring also increases the resistance to a flat object lifting the fingers just as the fingers pass over the tops of the rollers during lateral travel of the guide rail. As many of the fingers 50 are provided as there are gaps between rollers over which each of the guide rails are seated. So that the entire space above the surface of the movable platform and between the guide rails 31 and 31a remains unobstructed for the movement of articles, the fingers 50 and their support block 54 are mounted on the outer face of the guide rails by suitable means such as screws 56 (FIG. 7).

Figure 11:
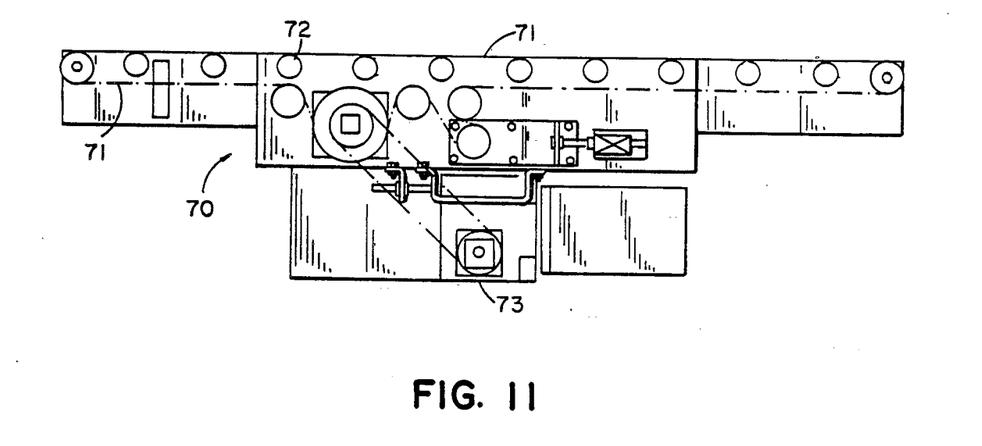
FIG. 11 is a side elevation view of one of the roller drive assemblies.

The rollers of the frame controlling the delivery of the articles received from the conveyor 30 are driven by a belt and prime mover assemblies 70 (FIGS. 3 and 11). These assemblies 70 are mounted to the platform 10 beneath the rollers 24 and each has a belt 71 supported on rollers 72 which hold it in driving engagement with the bottom surfaces of the article transporting rollers 10 above (not illustrated in FIGS. 3 and 11). Each belt 71 is driven by a prime mover 73. As will be observed from FIG. 3, in order to drive all of the rollers, four of the assemblies 70 are provided and travel with the platform as it is shifted from side-to-side.

When the articles are discharged from the path controlling platform 10, they pass onto the receiving and aligning conveyor sections 34 and 35. Preferably, these sections also have rollers with axes inclined to the sides of the conveyors to arrange the articles in single file along one side. To facilitate this, the outer side of each of the receiving conveyor sections is equipped with guard rail sections 90 to cause the articles to become properly aligned. The use of this equipment is not part of this invention and can be understood from U.S. Pat. No. 4,044,897 entitled CONVEYOR SORTING AND ORIENTING SYSTEM issued Aug. 30, 1977 and U.S. Pat. No. 4,284,186 entitled UNSCRAMBLING CONVEYOR issued Aug. 18, 1981. However, this equipment is useful in effecting neat and orderly arranged articles as they enter the next phase of their transport in the warehouse or other type of facility.

It will be recognized that the quantity of articles entering the flowsplitter can be monitored manually or automatically. Irrespective of the manner in which it is monitored, it is the purpose of the invention to provide easily and quickly manipulable equipment for positively, easily and expeditiously transporting articles under conditions in which the volume the equipment must handle may vary widely.

Having described a preferred embodiment of the invention, it will be understood that various modifications of the invention can be made without departing from its principles. Such modifications are to be considered as included in the hereinafter appended claims, unless the claims, by their language expressly state otherwise.

We claim:

1. Means for directing articles received from one conveying line to one or both of a pair of receiving conveying lines, said means being a frame having opposite edges and article directing rollers arranged along each of said edges and supporting means for the other ends of said rollers arranged along the centerline between said opposite edges, the rollers on each side of said centerline being so inclined to said centerline as to direct articles thereon away from said centerline and toward the opposite respective edges of said frame; said means having an article receiving area substantially narrower than the width of said frame and centered between said pair of receiving lines, means supporting said frame for movement laterally of the path of the articles entering said frame so that a greater portion of said receiving area is aligned with the rollers on one side of said centerline than the rollers on the other side thereof to vary the proportion of articles directed to one receiving line as compared to those directed to the other of the receiving lines.

2. Means for directing articles received from one conveying line to one or both of a pair of receiving lines, said means being a frame supporting a plurality of rollers arranged in two side-by-side groups forming a herringbone pattern centered about the centerline of the frame and having its apex directed away from said one conveying line, said means having a receiving area substantially narrower than the width of said frame and normally centered about said centerline, means supporting said frame for movement laterally of the path of articles entering said frame so that a greater proportion of said receiving area is aligned with the rollers on one side of said centerline than with the rollers on the other side thereof to vary the proportion of articles directed toward one of the receiving lines with respect to articles directed to the receiving line on the opposite side thereof.

3. The means for directing articles received from one conveying line to one or both of a pair of generally parallel receiving lines as described in claim 1 wherein said frame has a pair of article guides arranged in a divergent pattern in the direction of movement of articles over said means, said guides forming an article receiving area substantially narrower than the width of said frame and normally centered between the ends of said frame, means supporting said article guides in a stationary position with respect to said frame and receiving area and means supporting said frame for movement laterally with respect to said article guides for varying the proportion of the articles which are discharged therefrom to each of the receiving conveyors.

4. The means for varying the proportion of articles delivered from a single source conveyor which are to be delivered to one or both of a pair of receiving conveyors, said means comprising: an article allocating surface adapted to receive articles from said single source conveyor and to regulate the proportion of such articles which are delivered to each one of said pair of receiving conveyors, said allocating surface having rollers arranged in a herringbone pattern having its apex downstream of article movement and midway between the lateral sides of said surface, means forming the sides of an article guide path over said allocating surface, said means being a pair of guides diverging downstream of article movement, said guides and their position being stationary with respect to both said single source and receiving conveyors and means supporting said allocating surface for movement transversely of said guides whereby more of the articles received from said source conveyor are directed by said rollers to one of the two discharge conveyors than to the other.

5. The means for varying the proportion of articles received from a single source conveyor which are delivered to one or both of two receiving conveyors as described in claim 4 wherein said means forming the sides of the article guide path each have downwardly extending fingers which seat between the rollers of the allocating surface to prevent articles being transported by the rollers under said side forming means.

6. The means for varying the proportion of articles received from a single source conveyor which are to be delivered one to two receiving conveyors as described in claim 5 wherein each of said fingers is individually supported by a resilient means which enables the finger to move and pass over a roller passing beneath it as the allocating surface and its rollers moves laterally beneath it.

7. The means for varying the proportion of articles received from a single source conveyor which are to be delivered to one or both of two receiving conveyors as described in claim 6 wherein a tubular housing is provided for each of said fingers, each finger being telescopically supported in its tube and the tube being secured to one of said article path side forming means, means resiliently urging each of said fingers to project downwardly and means limiting said projection when its end is approximately at the plane of the axis of the rollers when the finger is situated midway between a pair of the rollers, the lower end of each finger being rounded to facilitate it being urged upwardly by a roller as the roller moves laterally beneath it.

8. The means for varying the proportion of articles received from a single source conveyor which are to be delivered to one or both of two receiving conveyors as described in claim 7 wherein each of said fingers is U-shaped having a U-shaped end to bias it up and over a roller which passes beneath it.

9. The means for varying the proportion of articles received from one conveyor which are to be delivered to one or both of two receiving conveyors as described in claim 4 wherein track means are provided for supporting said article allocating surface, friction reducing means between said article allocating surface and said track and means for reciprocally moving said article allocating surface lengthwise of said track.

10. Means for allocating the volume of articles obtained from a single source conveyor between two receiving conveyors, said means comprising: a flow directing bed member having a pair of side-by-side article transport panels each having rollers, the axes of the rollers of one of said panels being inclined to the axes of the rollers of the other of said panels to form a transport surface having a herringbone pattern with the convergence of said rollers being downstream of article movement thereover, said pair of receiving conveyors being connected to the article discharge side of said bed member; a pair of stationary article engaging guide elements and means supporting said guides in a stationary position above said bed member, said guide elements being divergent of each other and forming an article receiving passage at one end just wide enough for receiving articles from said source conveyor, said guides at their other ends being sufficiently divergent to form article discharge paths wide enough to provide discharge paths communicating simultaneously with both of said article receiving conveyors when the boundary between said panels is centered or substantially centered between said panels, said flow directing bed being wider than the combined widths of said article receiving conveyors, support means for said bed member extending laterally of the path of article movement over said bed member along which said bed member can move laterally of article flow so that only one of said transport panels receives articles from said source conveyor and thereby directs all of the articles it receives to a selected one of said receiving conveyors.

* * * * *

UNITED STATES PATENT AND TRADEMARK OFFICE
CERTIFICATE OF CORRECTION

PATENT NO.  : 5,101,958

DATED       : April 7, 1992

INVENTOR(S) : Curtis E. LeMay et al.

It is certified that error appears in the above-identified patent and that said Letters Patent is hereby corrected as shown below:

```
In the Title: On the title page
    Delete "FLOWSPITTING" and
    insert --FLOWSPLITTING--.

Column 2, line 50:
    After "assemblies 22"
    delete "20".
```

Signed and Sealed this

Twenty-eighth Day of December, 1993

Attest:

BRUCE LEHMAN

*Attesting Officer*    *Commissioner of Patents and Trademarks*